United States Patent
Liu et al.

(10) Patent No.: US 7,343,840 B2
(45) Date of Patent: Mar. 18, 2008

(54) SAWING MACHINE HAVING CUTTING ANGLE ADJUSTMENT MECHANISM

(75) Inventors: Chia-Sheng Liu, Chiayi County (TW); Yuan-Chih Ting, Taichung County (TW)

(73) Assignee: Duro Machinery Corp., Taichung (TW)

( * ) Notice: Subject to any disclaimer, the term of this patent is extended or adjusted under 35 U.S.C. 154(b) by 161 days.

(21) Appl. No.: 11/352,215

(22) Filed: Feb. 13, 2006

(65) Prior Publication Data

US 2007/0186742 A1    Aug. 16, 2007

(30) Foreign Application Priority Data

Nov. 14, 2005 (TW) .............................. 94219691 U

(51) Int. Cl.
*B27B 5/24* (2006.01)
(52) U.S. Cl. .................... 83/477.2; 83/473; 83/477.1; 83/DIG. 1
(58) Field of Classification Search .............. 83/477.2, 83/473, 477.1, 471.3, 471.1, 472, 471.2, 83/477, 582, 491, 581, 665, 698.31, 698.51, 83/698.61, DIG. 1
See application file for complete search history.

(56) References Cited

U.S. PATENT DOCUMENTS

| 2,844,173 | A | * | 7/1958 | Gaskell ...................... 83/477.1 |
| 2,945,516 | A | * | 7/1960 | Edgemond, Jr. et al. ...... 83/473 |
| 2,974,693 | A | * | 3/1961 | Goldschmidt et al. ........ 83/426 |
| 3,315,715 | A | * | 4/1967 | Mytinger .................... 83/477.2 |
| 3,538,964 | A | * | 11/1970 | Berends et al. ................ 83/473 |
| 3,581,784 | A | * | 6/1971 | Warrick et al. ............. 83/477.1 |
| 5,040,444 | A | * | 8/1991 | Shiotani et al. ............ 83/477.2 |
| 6,820,524 | B1 | * | 11/2004 | Ceroll et al. ............... 83/477.2 |
| 6,986,370 | B1 | * | 1/2006 | Schoene et al. ........... 83/477.2 |
| 7,137,327 | B2 | * | 11/2006 | Garcia et al. .............. 83/477.2 |
| 7,240,706 | B2 | * | 7/2007 | Liu et al. .................... 83/477.2 |
| 2001/0032534 | A1* | | 10/2001 | Ceroll et al. ............... 83/477.1 |
| 2006/0201302 | A1* | | 9/2006 | Schwaiger et al. ........ 83/477.2 |
| 2006/0236835 | A1* | | 10/2006 | Liu et al. ...................... 83/581 |

\* cited by examiner

*Primary Examiner*—Stephen Choi
(74) *Attorney, Agent, or Firm*—Bacon & Thomas, PLLC

(57) ABSTRACT

A sawing machine has a cutting angle adjustment mechanism for adjusting the cutting angle of a saw blade. The adjustment mechanism includes a handwheel for rotation by the user to bias a bracket on which a saw unit having the saw blade is mounted so as to further adjust the cutting angle of the saw blade, and a positioning member, which is rotatable between a first position to lock the bracket in position and stop the handwheel from biasing the bracket and a second position to allow operation of the handwheel to bias the bracket.

9 Claims, 6 Drawing Sheets

SAWING MACHINE HAVING CUTTING ANGLE ADJUSTMENT MECHANISM

BACKGROUND OF THE INVENTION

1. Field of the Invention

The present invention relates to a sawing machine and more specifically, to a sawing machine having a cutting angle adjustment mechanism for controlling the cutting angle of the saw blade.

2. Description of the Related Art

Conventionally, a table saw uses a screw rod for controlling the tilting angle of a bracket to further adjust the cutting angle of the saw blade of the saw unit at the bracket. However, it takes much time and labor to rotate the screw rod to the desired position.

Nowadays, handwheel and gear transmission mechanisms are commonly used in table saws for adjusting the cutting angle of the saw blade conveniently with less effort. A handwheel and gear transmission mechanism for this purpose comprises an arched rack fixedly provided at the base of the table saw, a handwheel, which has a gear fixedly provided at one side for engaging the arched rack for allowing rotation of the handwheel to tilt the bracket that carries the saw unit, and a spring member provided between the bracket and the handwheel and adapted to force the gear of the handwheel away from the arched rack. When wishing to change the cutting angle of the saw blade of the saw unit, the operator must press the handwheel to force the gear of the handwheel into engagement with the arched rack, and then rotate the handwheel to bias the bracket. When released the hand, the spring member automatically pushes the handwheel away from the arched rack, keeping the bracket in the adjusted tilting angle. This design is functional; however, it is not safety in use. When the operator or another worker passes through one side of the table saw and touches the handwheel accidentally, the handwheel may be forced into engagement with the arched rack such that the handwheel will be rotated to change the tilting angle of the bracket. In this case, the operator shall have to correct the cutting angle of the saw blade of the saw unit again.

SUMMARY OF THE INVENTION

The present invention has been accomplished under the circumstances in view. It is the main object of the present invention to provide a sawing machine having a cutting angle adjustment mechanism, which prevents biasing of the tilting angle adjustment handwheel accidentally.

To achieve this object of the present invention, the sawing machine comprises a base and a cutting angle adjustment mechanism for adjusting the cutting angle of a saw blade. The cutting angle adjustment mechanism comprises a bracket on which a saw unit having the saw blade is mountable pivotally mounted inside the base, an axle coupled to the bracket, a handwheel movably coupled to the axle and provided with a gear at one side thereof, a screw rod coupled to the bracket, a toothed plate fixedly fastened to the base, located between the handwheel and the bracket and provided with a smoothly arched sliding slot through which the screw rod extends, and a rack for the engagement of the gear of the handwheel for allowing the bracket to be biased upon a rotary motion of the handwheel, and a positioning member fastened to the screw rod and provided with a stop flange turnable with the positioning member in and out of the space between the gear of the handwheel and the base. The stop flange prohibits engagement of the gear of the handwheel with the rack when it is turned with the positioning member into the space between the gear of the handwheel and the base.

DETAILED DESCRIPTION OF THE INVENTION

Figure 1:
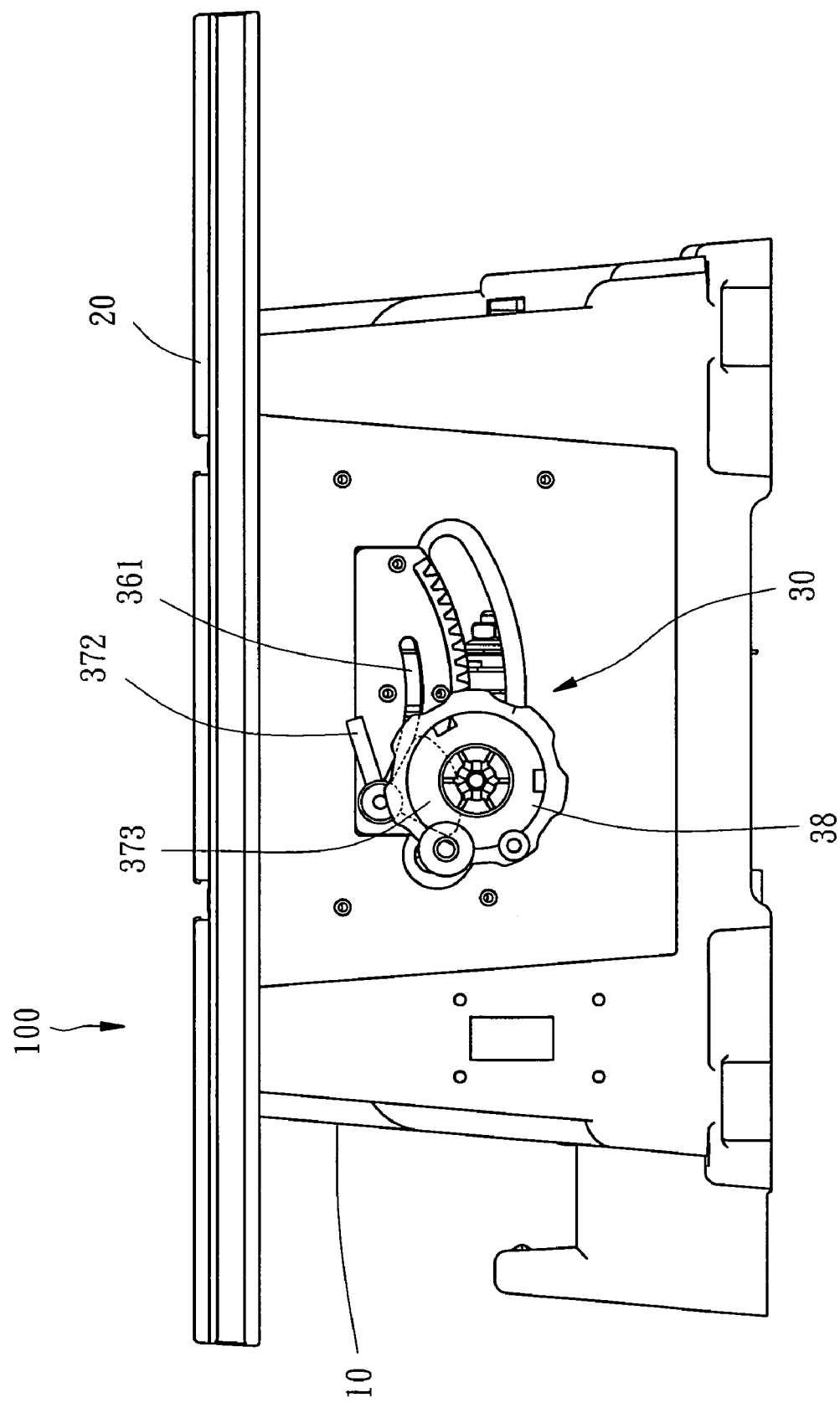
FIG. 1 is a front view of the preferred embodiment of the present invention.
Figure 2:
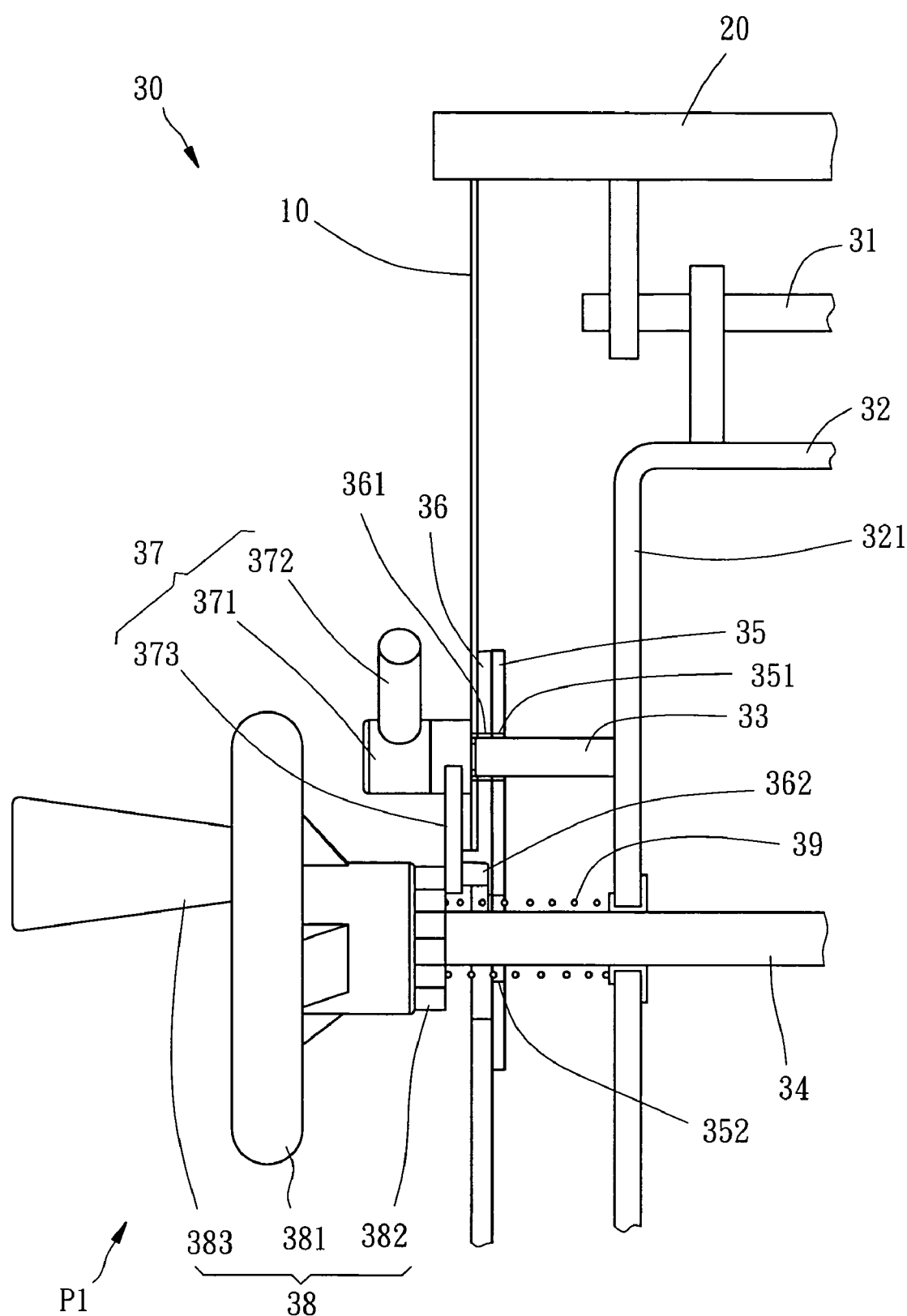
FIG. 2 is a schematic sectional side view of a part of the preferred embodiment of FIG. 1.

As shown in FIGS. 1 and 2, a table saw 100 provided by the preferred embodiment of the present invention comprises a base 10, a worktable 20, a saw unit (not shown) located inside the base 10 and installed with a saw blade (not shown), and a cutting angle adjustment mechanism 30 installed in the base 10 for controlling the cutting angle of the saw blade installed in the saw unit that is mounted to the cutting angle adjustment mechanism 30. Because the saw unit is of the known art and not within the scope of the claims of the present invention, no further detailed description in this regard is necessary.

The cutting angle adjustment mechanism 30 comprises a pivot shaft 31, a bracket 32, a screw rod 33, an axle 34, a reinforcing plate 35, a toothed plate 36, a positioning member 37, a handwheel 38, and a spring member 39.

The bracket 32 is vertically pivotally mounted inside the base 10 below the worktable 20 by the pivot shaft 31 to carry the saw unit, and can be biased to adjust the cutting (tilting) angle of the saw blade installed in the saw unit.

The screw rod 33 and the axle 34 are pivotally mounted in the front wall 321 of the bracket 32 at different elevations and arranged in parallel to the pivot shaft 31. Further, the screw rod 33 and the axle 34 each have one end respectively extending out of the corresponding side of the base 10.

Figure 3:
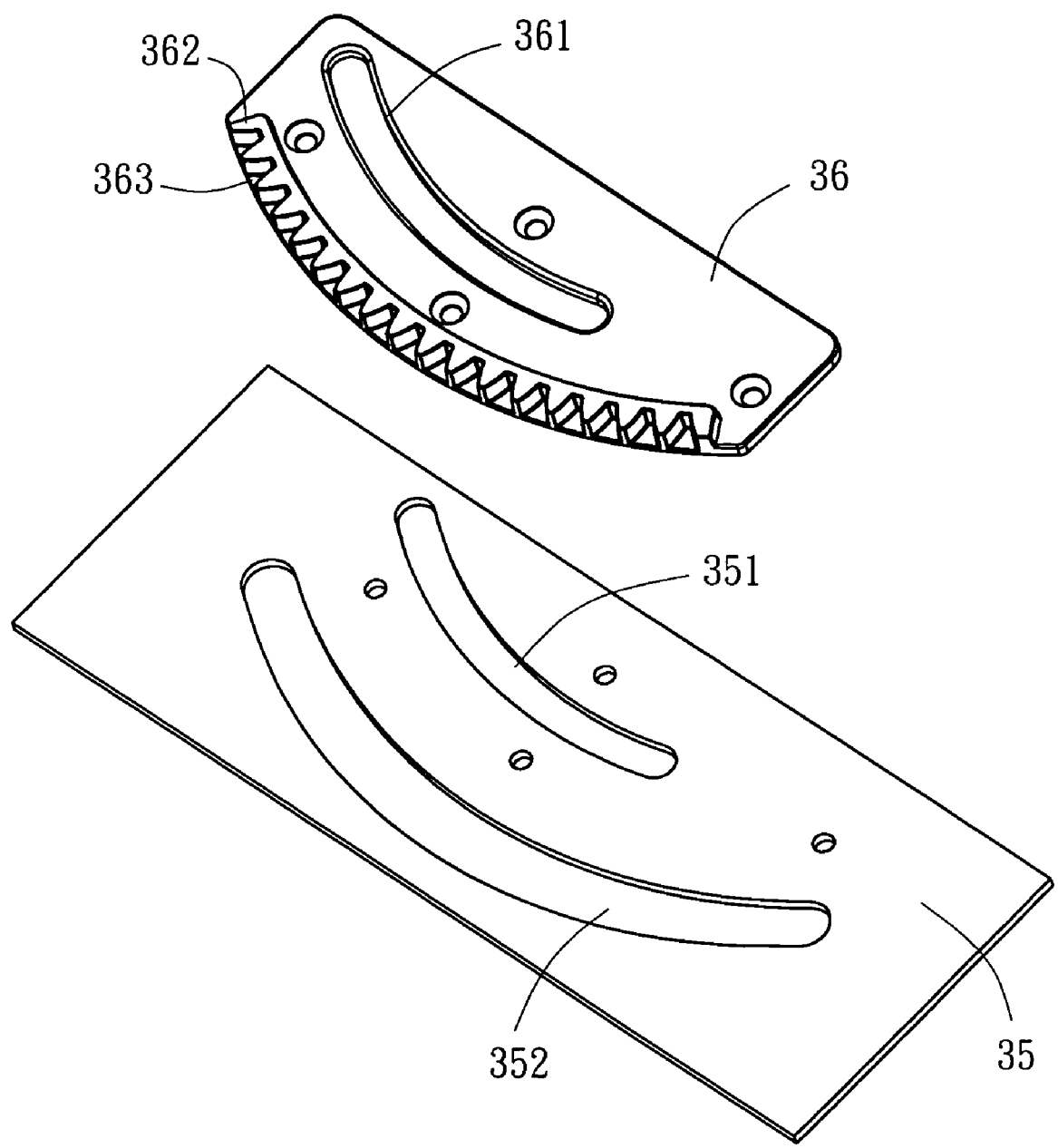
FIG. 3 is a perspective view of the reinforcing plate and the toothed plate used in the preferred embodiment of the present invention.

The reinforcing plate 35 and the toothed plate 36 are attached together and affixed to one side of the base 10. As shown in FIG. 3, the reinforcing plate 35 has a first smoothly arched sliding slot 351 and a second smoothly arched sliding slot 352 arranged in parallel. The toothed plate 36 has a smoothly arched sliding slot 361 corresponding to the first smoothly arched sliding slot 351 of the reinforcing plate 35, a smoothly arched stop wall 363 arranged corresponding to the curvature of the second smoothly arched sliding slot 352 of the reinforcing plate 35, and a smoothly arched rack 362 raised from and formed integral with one side of the smoothly arched stop wall 363. The screw rod 33 is inserted through the first smoothly arched sliding slot 351 of the reinforcing plate 35 and the smoothly arched sliding slot 361 of the toothed plate 36 to the outside of the base 10. The axle 34 is inserted through the second smoothly arched sliding slot 352 of the reinforcing plate 35 to the outside of the base 10.

Figure 4:
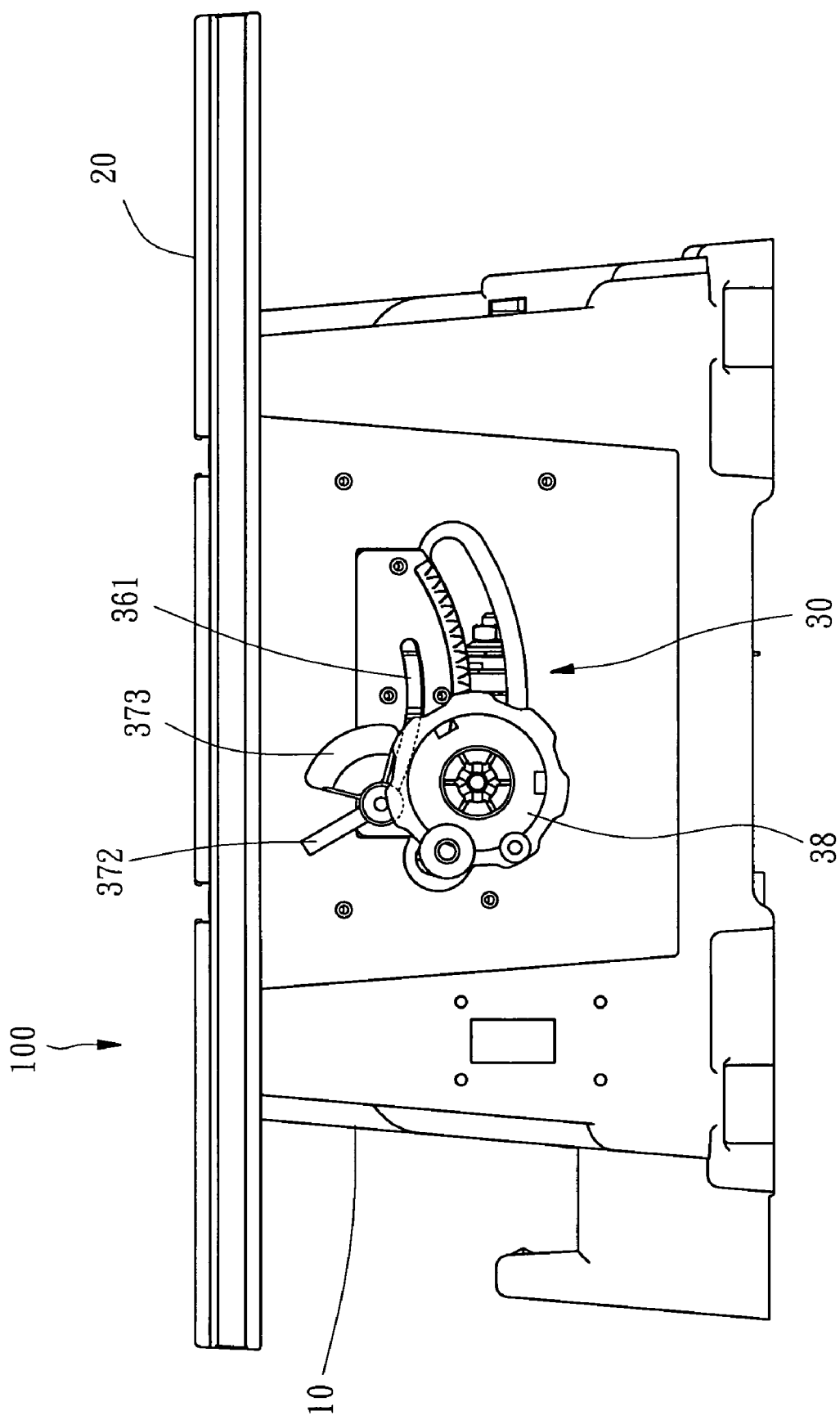
FIG. 4 is similar to FIG. 1 but showing the stop flange of the positioning member moved away from the space between the gear of the handwheel and the outside wall of the base.
Figure 5:
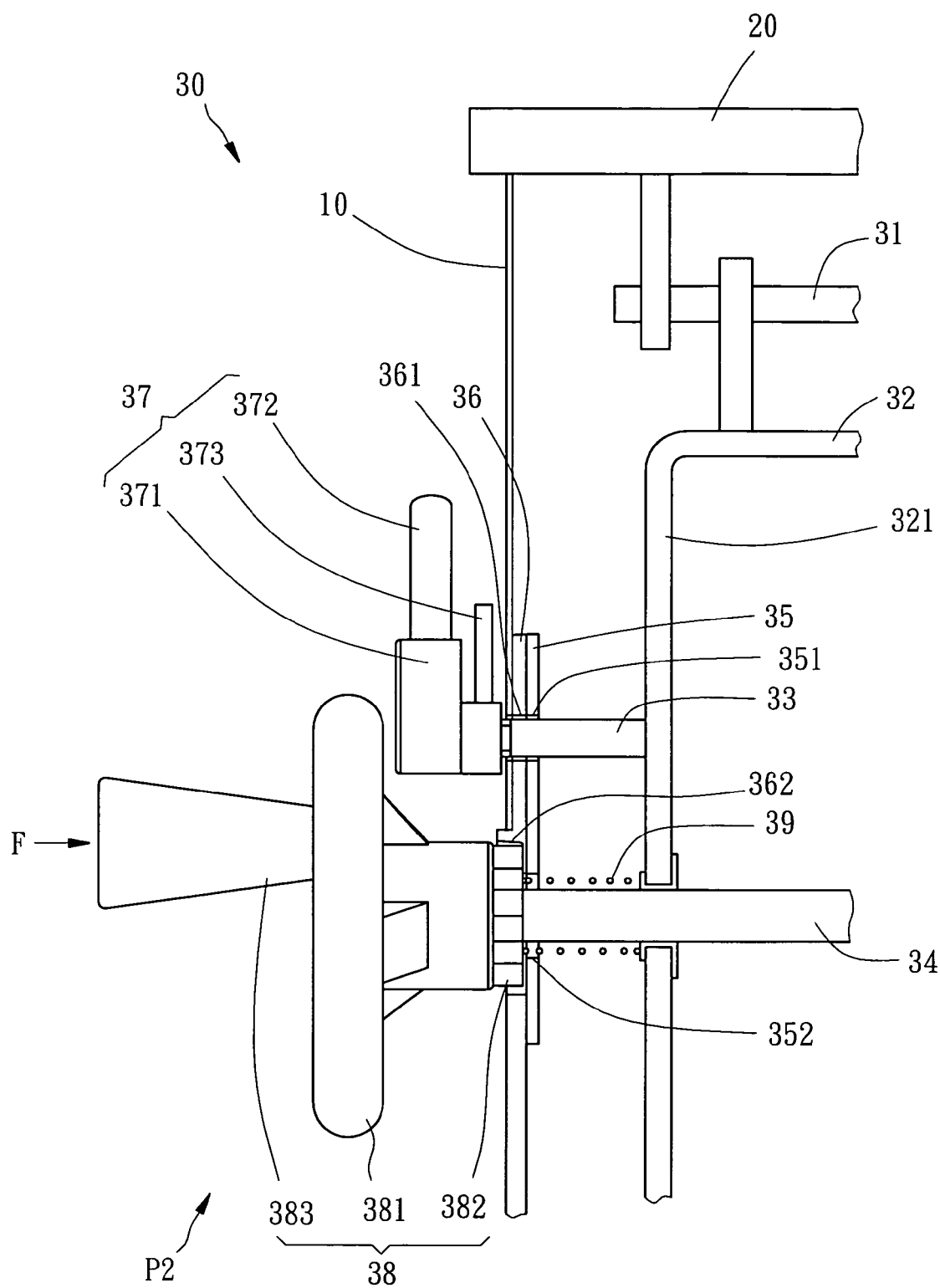
FIG. 5 is a schematic sectional side view of a part of the preferred embodiment shown in FIG. 4.
Figure 6:
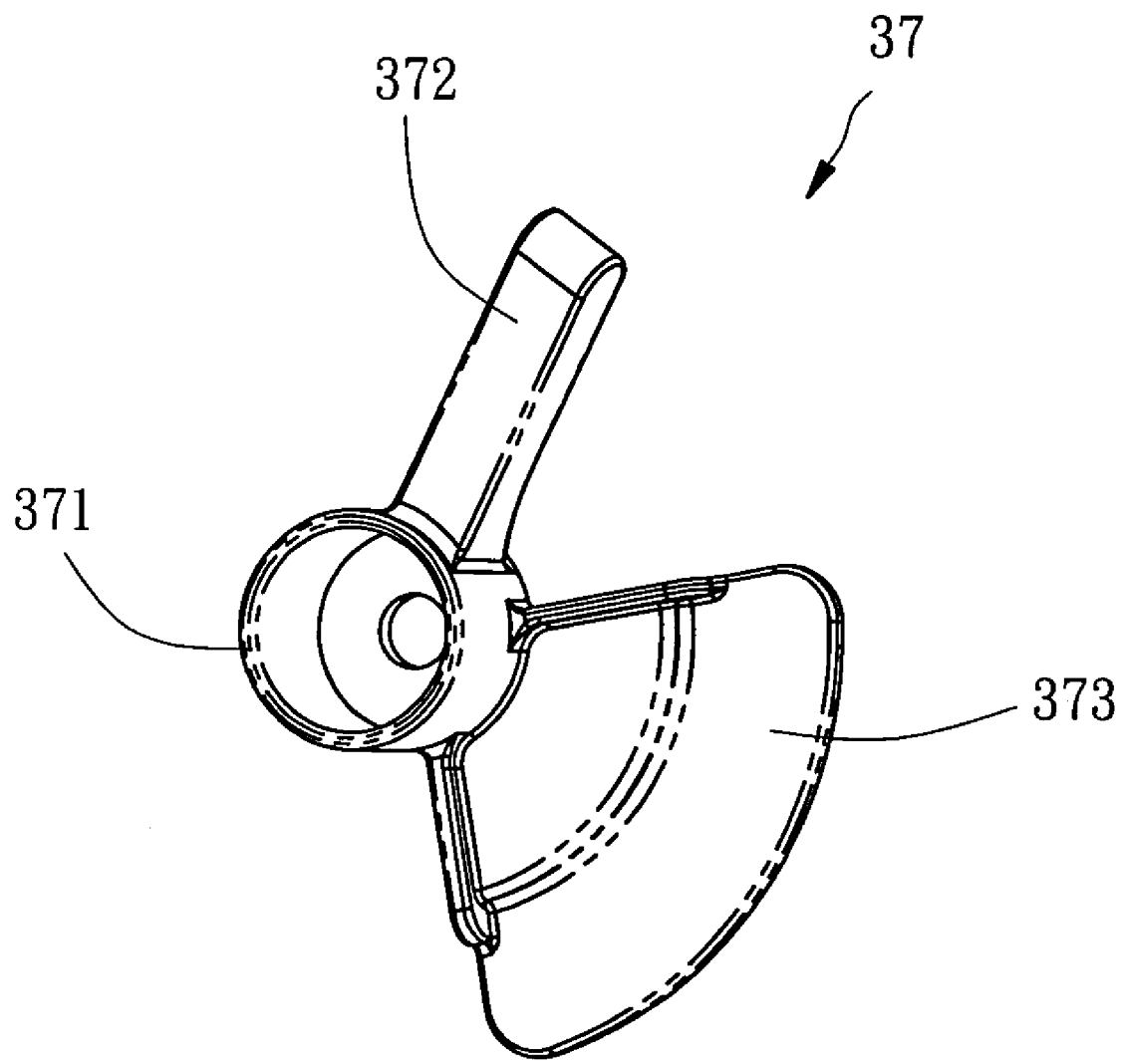
FIG. 6 is a perspective view of the positioning member used in the preferred embodiment of the present invention.

Referring to FIG. 6 and FIG. 2 again, the positioning member 37 comprises a socket 371, a handle 372, and a stop flange 373. The socket 371 is fixedly capped on the end of the screw rod 33 outside the base 10. The handle 372 is perpendicularly formed integral with the peripheral wall of the socket 371 and suspending outside the base 10 for turning by the operator to rotate the screw rod 33. The stop flange 373 extends outwards from the peripheral wall of the socket 371. When the trust flange 373 is rotated to a position as shown in FIG. 2, the socket 371 and the screw rod 33 are also rotated to force the bottom of the socket 371 into close contact with the outside wall of the base 10 and to further lock the screw rod 33 to the base 10, keeping the screw rod 33 positioned in a specific position in the smoothly arched sliding slot 361 of the toothed plate 36. At this time, the bracket 32 can be held in a specific tilting position. FIGS. 4 and 5 show the positioning member 37 is turned to an unlocking position where the bottom of the socket 371 is kept away from the outside wall of the base 10.

The handwheel 38 is slidably fastened to the end of the axle 34 outside the base 10, and can be moved along the extending direction of the axle 34 between a first position (idle position) P1 (see FIG. 2) and a second position (engagement position) P2 (see FIG. 5). The handwheel 38 comprises a wheel body 381, a gear 382 disposed at one side of the wheel body 381, and a handle 383 disposed at the other side of the wheel body 381 at an eccentric location.

The spring member 39 is sleeved onto the axle 34 and stopped between the bracket 32 and the handwheel 38. The spring member 39 imparts an outward pressure F to the handwheel 38 to force the gear 382 away from the smoothly arched rack 362 of the toothed plate 36, i.e., to hold the handwheel 38 in the first position P1.

The operation of the cutting angle adjustment mechanism 30 is described hereinafter. When the handwheel 38 is in the first position P1 as shown in FIG. 2, the bottom of the socket 371 of the positioning member 37 is stopped against the outside wall of the base 10 and the stop flange 373 is set between the gear 382 of the handwheel 38 and the outside wall of the base 10. If the operator or a person touches the handwheel 38 and forces the handwheel 38 inwards accidentally, the gear 382 of the handwheel 38 will touch the stop flange 373 of the positioning member 37 at first, i.e., the stop flange 373 stops the gear 382 of the handwheel 38 from touching the rack 362 of the toothed plate 36, preventing a change of the cutting angle of the saw blade of the saw unit.

Referring to FIG. 5, when wishing to change the cutting angle of the saw blade of the saw unit, rotate the socket 371 of the positioning member 37 and the screw rod 33 to move the stop flange 373 to the position shown in FIGS. 4 and 5, i.e., to move the stop flange 373 away from the space between the gear 382 of the handwheel 38 and the outside wall of the base 10, and then impart a force F to the handwheel 38 to move the handwheel 38 to the second position P2 and to simultaneously force the gear 382 of the handwheel 38 into engagement with the rack 362 of the toothed plate 36, and then operate the handle 383 or the wheel body 381 to rotate the handwheel 38, thereby biasing the bracket 32 to the desired tilting angle.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sawing machine comprising:
   a base; and
   a cutting angle adjustment mechanism comprising:
   a pivot shaft mounted inside said base;
   a bracket on which a saw unit is mountable pivotally mounted to said pivot shaft;
   an axle arranged in parallel to said pivot shaft, said axle having a first end coupled to said bracket and a second end extending out of an outside wall of said base;
   a handwheel coupled to the second end of said axle and movable along said axle between an idle position and an engagement position, said handwheel having a wheel body for rotation by the user and a gear disposed at one side of said wheel body;
   a screw rod arranged in parallel to said pivot shaft, said screw rod having a first end coupled to said bracket and a second end extending out of the outside wall of said base;
   a toothed plate fixedly fastened to said base and located between said handwheel and said bracket, said toothed plate having a smoothly arched sliding slot through which said screw rod extends, and a rack for the engagement of said gear of said handwheel for allowing said bracket to be biased upon a rotary motion of said handwheel after said handwheel has been moved to said engagement position; and
   a positioning member fixedly fastened to the second end of said screw rod and rotatable with said screw rod relative to said base and said bracket, said positioning member having a stop flange turnable with said positioning member in and out of the space between said gear of said handwheel and said base, said stop flange being for prohibiting movement of said handwheel from said idle position to said engagement position when turned with said positioning member into the space between said gear of said handwheel and said base.

2. The sawing machine as claimed in claim 1, wherein said saw unit comprises a saw blade for cutting.

3. The sawing machine as claimed in claim 1, wherein said toothed plate has a smoothly arched stop wall protruding from one side thereof; said rack of said toothed plate is an arched rack raised from and formed integral with one side of said smoothly arched stop wall.

4. The sawing machine as claimed in claim 1, wherein said positioning member comprises a socket fixedly capped on the second end of said screw rod and rotatable with said screw rod backwards and forwards relative to said base for stopping against a part of said base to hold said screw rod in a position in the smoothed arched sliding slot of said toothed plate; said stop flange of said positioning member extends outwards from the periphery of said socket.

5. The sawing machine as claimed in claim 4, wherein said positioning member has a handle formed integral with said socket for operation.

6. The sawing machine as claimed in claim 1, wherein said handwheel comprises a handle perpendicularly extending from one side of said wheel body opposite to said gear.

7. The sawing machine as claimed in claim 1, further comprising a spring member sleeved onto said axle and stopped between said bracket and said handwheel for supporting said handwheel in said idle position.

8. A positioning member used in a sawing machine having a base, a bracket on which a saw unit having a saw blade is mountable pivotally mounted inside said base, a toothed plate affixed to said base, and a cutting angle adjustment mechanism for biasing said bracket to adjust the cutting angle of said saw unit, said cutting angle adjustment mechanism having a handwheel configured with a gear and movable between an idle position where said handwheel is disengaged from said toothed plate and runs idle when rotated, and an engagement position where said handwheel is engaged with said toothed plate and rotatable to bias said bracket, said positioning member comprising:

a socket coupled to said bracket and rotatable relative to said bracket; and a stop flange connected to said socket and turnable with said socket in and out of the space between said handwheel and said base, said stop flange being for prohibiting movement of said handwheel from said idle position to said engagement position when turned with said socket into the space between said gear of said handwheel and said base.

9. The positioning member as claimed in claim 8, wherein said stop flange is formed integral with a part of said socket.

\* \* \* \* \*